United States Patent [19]
Arthurs et al.

[11] Patent Number: 5,461,110
[45] Date of Patent: Oct. 24, 1995

[54] CROSS-LINKABLE ADHESIVE POLYMERS

[75] Inventors: Trevor C. Arthurs; John R. B. Boocock; Peter Y. Kelly, all of Kingston; Wayne F. Bryce, Camlachie, all of Canada

[73] Assignee: Du Pont Canada Inc., Mississauga, Canada

[21] Appl. No.: 237,803

[22] Filed: May 4, 1994

[51] Int. Cl.$^6$ .............................. C08L 51/00; C08L 51/06
[52] U.S. Cl. ...................... 525/71; 427/207.1; 427/208.2
[58] Field of Search .................................. 525/71, 74, 78; 427/207.1, 208.2

[56] References Cited

U.S. PATENT DOCUMENTS

| | | | |
|---|---|---|---|
| 4,558,094 | 12/1985 | Deguchi et al. | 525/71 |
| 4,612,155 | 9/1986 | Wong et al. | 264/176 |
| 4,618,654 | 10/1986 | Schmidtchen et al. | 525/71 |

FOREIGN PATENT DOCUMENTS

| | | |
|---|---|---|
| 0369604 | 10/1989 | European Pat. Off. . |
| 319335 | 12/1987 | Japan . |

*Primary Examiner*—Paul R. Michl
*Assistant Examiner*—Mark L. Warzel
*Attorney, Agent, or Firm*—Craig H. Evans

[57] ABSTRACT

An adhesive composition formed by admixing under melt conditions (a) 50–95% by weight of a moisture cross-linkable silane-grafted polyolefin having a melt viscosity of less than 100 000 cps, and (b) 5–50% by weight of a polyolefin grafted with at least one ethylenically-unsaturated carboxylic acid or anhydride, and derivatives thereof. The grafted polyolefin has a melt viscosity of less than 100 000 cps, and contains a catalyst for moisture cross-linking of the silane-grafted polyolefin of (a). The adhesive may be used to bond a variety of substrates.

10 Claims, No Drawings

CROSS-LINKABLE ADHESIVE POLYMERS

The present invention relates to a cross-linkable adhesive polymer composition which is capable of being applied to a substrate in a molten form and then cross-linked subsequent to application to a substrate.

Structures may be bonded together using a variety of adhesives. One adhesive that is relatively easy to apply while still providing good bonding properties is an isocyanate-containing polyurethane adhesive, which may be sprayed onto a substrate and then subsequently cured to provide a strong bond. However, the use of such polyurethane adhesives in lamination processes represents an occupational health risk and major precautions must be taken during operation of the process in order to protect the personnel involved. An alternate adhesive under development is a moisture curable 100% solid hot-melt polyurethane adhesive, but it is understood that such adhesives developed to date suffer from stability problems and may not have the desired bond strength for many end uses. It would be desirable to have alternate processes that do not use polyurethane adhesives.

The cross-linking of a polymer is used to alter the properties of the polymer. Thus, it is possible to fabricate a polymer into a shape, including in the form of an adhesive, and then to cross-link the polymer to improve the end use properties. In one such method, vinyl silanes e.g. vinyl trimethoxysilane (VTMS) and vinyl triethoxysilane (VTES), are grafted onto polymers. The grafted polymers are formed into a desired shape under molten conditions and the resultant article is subsequently subjected to moisture e.g. steam or atmospheric moisture, whereupon the silane residue forms cross-links between polymer chains. The grafting reaction of the vinyl silane onto the polymer is usually carried out in the presence of an organic peroxide, and the cross-linking reaction with moisture is usually carried out in the presence of a cross-linking catalyst.

An adhesive for heat-sealing of metals and plastics is disclosed in Japanese Patent 1,161,079 of Showa Electric Wire KK, which issued Jun. 23, 1989. The adhesive composition disclosed is composed of 100 parts by weight of one or more of polyethylene, polypropylene, ethylene/vinyl acetate copolymer or ethylene/ethyl acrylate copolymer grafted with maleic acid and/or acrylic acid in amounts of 0.5–10 wt. %, and 0.1–5 parts by weight of a silane coupling agent. Preferably the adhesive composition is blended with 0.05–3 wt. % of an organic peroxide that has a half-life of one minute at a temperature in the range of 100°–180° C. The adhesive is stated to have good adhesion and heat resistance in the bonding of plastics to metal and plastics to plastics, but would not be stable under melt conditions and hence not useful as a hot melt adhesive.

As used herein, melt viscosity is measured at 190° C. on a Brookfield viscometer at a shear rate of 0.35 $sec^{-1}$.

An adhesive with both storage stability and good bonding properties has now been found.

Accordingly, the present invention provides an adhesive composition formed by admixing under melt conditions:
  (a) 50–95% by weight of a moisture cross-linkable silane-grafted polyolefin having a melt viscosity of less than 100 000 cps, and
  (b) 5–50% by weight of a polyolefin grafted with at least one ethylenically-unsaturated carboxylic acid or anhydride, and derivatives thereof, said grafted polyolefin having a melt viscosity of less than 100 000 cps, said grafted polyolefin containing a catalyst for moisture cross-linking of the silane-grafted polyolefin of (a).

In a preferred embodiment of the adhesive of the present invention, the moisture cross-linking catalyst is dibutyl tin dilaurate.

In a further embodiment of the present invention, the polyolefin is selected from ethylene/vinyl acetate copolymer, polypropylene, polyethylene, ethylene/(meth) acrylate and ethylene/(meth) acrylic acid copolymers and copolymers of ethylene, alkyl acrylate and carbon monoxide.

The present invention also provides a process for forming an adhesive composition comprising:
  (i) admixing under melt conditions
    (a) 50–95% by weight of a moisture cross-linkable silane-grafted polyolefin having a melt viscosity of less than 100 000 cps, and
    (b) 5–50% by weight of a polyolefin grafted with at least one ethylenically-unsaturated carboxylic acid or anhydride, and derivatives thereof, said grafted polyolefin having a melt viscosity of less than 100 000 cps, said grafted polyolefin containing a catalyst for moisture cross-linking of the silane-grafted polyolefin of (a), and
  (ii) applying the molten adhesive so formed to a substrate.

The present invention further provides a process for the bonding of a first substrate to a second substrate comprising coating the first substrate with a composition formed by the admixing under molten conditions of:
  (a) 50–95% by weight of a moisture cross-linkable silane-grafted polyolefin having a melt viscosity of less than 100 000 cps, and
  (b) 5–50% by weight of a polyolefin grafted with at least one ethylenically-unsaturated carboxylic acid or anhydride, and derivatives thereof, said grafted polyolefin having a melt viscosity of less than 100 000 cps, said grafted polyolefin containing a catalyst for moisture cross-linking of the silane-grafted polyolefin of (a),
contacting the second substrate with the molten adhesive, and subsequently exposing the substrates and interposed layer of adhesive to moisture.

In embodiments of the processes of the invention, the molten adhesive is applied to the first substrate within five minutes of the admixing under melt conditions, preferably within one minute and especially within 30 seconds.

The present invention also provides a bonded structure formed from two substrates and an interposed layer of an adhesive composition formed by admixing under melt conditions:
  (a) 50–95% by weight of a moisture cross-linkable silane-grafted polyolefin having a melt viscosity of less than 100 000 cps, and
  (b) 5–50% by weight of a polyolefin grafted with at least one ethylenically-unsaturated carboxylic acid or anhydride, and derivatives thereof, said grafted polyolefin having a melt viscosity of less than 100 000 cps, said grafted polyolefin containing a catalyst for moisture cross-linking of the silane-grafted polyolefin of (a),
said interposed layer having been exposed to moisture to effect said cross-linking after application of the adhesive between the two substrates.

In embodiments, the substrate is selected from polyolefins, cellulosic materials e.g. wood, polyvinyl chloride, ethylene/propylene/diene copolymers and chlorosulphonated polyolefins.

A wide variety of polyolefins may be used in the adhesive of the present invention. Different polyolefins may be used for the silane-grafted component and for the ethylenically unsaturated carboxylic acid or anhydride-grafted component. If different polyolefins are used, then those polyolefins, particularly in their grafted forms, must be compatible in order that the resultant adhesive has acceptable properties. In preferred embodiments of the present invention, the polyolefins used in the two components are of the same type e.g. they are both polypropylene, and in particularly preferred embodiments the polyolefins have the same density and melt index.

The polyolefin may be a homopolymer of ethylene or a copolymer of ethylene with at least one $C_4$–$C_{10}$ hydrocarbon alpha-olefin, especially copolymers of ethylene with butene-1, hexene-1 and/or octene-1. Such polyolefins may be made by a wide variety of olefin polymerization processes known in the art, including the high pressure polymerization of ethylene, the formation of homopolymers and copolymers under slurry conditions, in solution polymerization processes or in gas-phase polymerization processes. The so-called single-site catalyst processes may also be used to obtain the polymer. The density of the polymer may range from about 0.890 g/cm³ to about 0.970 g/cm³ i.e. the full range known for such polymers. The melt viscosity, measured as defined above, is less than 100 000 cps.

The polyolefin may also be polypropylene. As used herein, the expression "polypropylene" refers to homopolymers of propylene, to impact or so-called block copolymers of propylene with ethylene in which the ethylene content is less than about 25% by weight and to random copolymers of propylene with ethylene in which the ethylene content is less than 8% by weight. The polypropylene has the same melt viscosity characteristics as the polyethylene described above.

Alternatively, the polyolefin may be a copolymer of ethylene and at least one comonomer selected from carbon monoxide, vinyl acetate, alkyl acrylates and alkyl methacrylates, in which the alkyl group has 1–4 carbon atoms. In embodiments, the copolymer is characterized by having a heat of crystallization of less than 70 J/g. Moreover, if the copolymer is an ethylene/vinyl acetate copolymer, then the copolymer has a vinyl acetate content of at least 10% by weight. Examples of the copolymers are ethylene/vinyl acetate copolymers, ethylene/methyl acrylate copolymers, ethylene/ethyl acrylate copolymers, ethylene/butyl acrylate copolymers, ethylene/isobutyl acrylate copolymers, ethylene/vinyl acetate/carbon monoxide copolymers, ethylene/ethyl acrylate/carbon monoxide copolymers, ethylene/butyl acrylate/carbon monoxide copolymers, ethylene/ethyl methacrylate/carbon monoxide copolymers and ethylene/butyl methacrylate/carbon monoxide copolymers. The melt index of such copolymers is the same as that described above for polyethylene.

The vinyl silane is a vinyl trialkoxysilane selected from the group consisting of vinyl trimethoxysilane and vinyl triethoxysilane. Such silanes are available commercially. While compositions containing vinyl silane and grafting catalyst may be used, such compositions do not contain a cross-linking catalyst.

The vinyl silane must be maintained in a moisture-free environment at all times prior to the desired time of cross-linking i.e. after extrusion of the adhesive onto and between the substrates that are to be bonded, as will be understood by persons skilled in the art of moisture-curable adhesives. The vinyl silane is grafted onto the polymer used in component (a) of the adhesive composition. It is preferred that a grafting catalyst be used e.g. an organic peroxide for example dicumyl peroxide, in amounts of, for example, 0.01–0.25 % by weight of the polyolefin. The concentration of the vinyl silane, the melt temperature and the residence time of the admixture under melt conditions during the grafting of the vinyl silane onto the polyolefin are all believed to be important variables in the grafting reaction. The temperature should be below the temperature at which the polyolefin is significantly degraded. Liquid compositions of vinyl silane and grafting catalyst are commercially available e.g. in which the grafting catalyst is 2,5-dimethyl-2,5-di-(t-butyl peroxy) hexane, the also latter being available as Lupersol® 101.

The polyolefin of component (b) is grafted with an ethylenically unsaturated carboxylic acid or anhydride. The grafting monomer is at least one monomer selected from ethylenically unsaturated carboxylic acids and ethylenically unsaturated carboxylic acid anhydrides, including, less preferably, derivatives of such acids, and mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride, and substituted maleic anhydride, e.g. dimethyl maleic anhydride or citraconic anhydride, nadic anhydride, nadic methyl anhydride, and tetrahydrophthalic anhydride, maleic anhydride being particularly preferred. Examples of the derivatives of the unsaturated acids are salts, amides, imides and esters e.g. mono- and disodium maleate, acrylamide, maleimide, glycidyl methacrylate and dimethyl fumarate. Techniques for the grafting of such monomers onto the polyolefin are known e.g. as described in U.S. Pat. No. 4,612,155 of R. A. Zelonka and C. S. Wong, which issued Sep. 16, 1986, and in published European patent application No. 0 369 604 of D. J. Mitchell, published May 23, 1990. The present invention will be particularly described herein with reference to maleic anhydride as the grafting monomer.

The melt viscosity of the polyolefin composition should be less than about 100 000 cps, and preferably less than 50 000 cps. It is also known to use blends of grafted and ungrafted polyolefins to order to achieve a desired level of graft in a composition.

A cross-linking catalyst for the moisture curing reaction is incorporated into component (b). Examples of cross-linking catalysts are titanates and carboxylic acids salts of zinc, iron and tin e.g. zinc octoate, tin octoate and dibutyltin dilaurate. The amount of cross-linking catalyst used may be varied over a wide range as will be understood by those skilled in the art. In embodiments, dibutyltin dilaurate may be used in amounts of at least 0.01% by weight of the polymer to be cross-linked, especially 0.01–0.1% by weight, and in particular about 0.05% by weight. Increasing the amount of cross-linking catalyst tends to increase the rate of cross-linking of the polymer but the quality of the molten polymer may be adversely affected.

The adhesive is maintained in the form of two separate components until just prior to use. It is understood that both components would normally be preformed i.e. having been formed in separate reactions, although it could be envisaged that one or both components could be formed in situ in separate reactions and then fed directly into the means used to admix and form the adhesive of the invention. It is also understood that the moisture cross-linkable silane-grafted polyolefin would be maintained in a moisture-free condition prior to forming of the adhesive, as is known for moisture-cross-linkable adhesives.

The adhesive of the present invention is formed by admixing components (a) and (b) under melt conditions. This may be achieved by admixing the adhesive in a pelletized form and subsequently extruding under melt conditions whereby the components are admixed to form the adhesive. The adhesive is extruded directly onto a substrate i.e. while the adhesive is still in a molten condition. Alternatively each of component (a) and component (b) could be heated into a molten condition and the molten components then admixed and extruded. Apparatus suitable for the mixing of the two components and application as an adhesive are known e.g. the two-component hot-melt adhesive applicator known as a Nordson two-component applicator system.

It is an important aspect of the present invention that the adhesive composition be applied to the substrates shortly after formation from the two components thereof. For example, two-component adhesive applicators may be used. In such applicators the adhesive might remain in an admixed form for a short period of time e.g. only a few seconds. However, as illustrated hereinafter, the adhesive has poor stability in an admixed molten form, and thus should be used shortly after preparation, especially within five minutes of admixing under molten conditions, preferably within one minute and especially within 30 seconds.

The adhesive is applied to a first substrate in a molten condition and then the second substrate is applied over the adhesive while the adhesive is still in a molten condition. Contact of the adhesive while molten with both substrates is important in order to achieve a good bond. The resultant substrates with interposed layer of adhesive is then exposed to moisture for a period of time until the bond between the adhesive and each substrate has developed to a sufficient degree. This may be done by simply exposing the bonded substrates to moisture in the atmosphere. Alternatively, the bonded substrates may be subjected to high humidity conditions e.g. steam, in order to promote the adhesion.

Examples of substrates that may be bonded are polyolefins, cellulosic materials e.g. wood, polyvinyl chloride, ethylene/propylene/diene copolymers, chlorosulfonated copolymers and the like.

As used herein, the shear adhesion fail test is conducted according to the procedure of ASTM D4498 "Heat-Fail Temperature in Shear of Hot-melt Adhesives".

The adhesive of the present invention may be used in the bonding of a wide variety of substrates. In addition the adhesive is maintained in a stable condition, as two separate components, until such time as it is needed.

The adhesive is extrudable with relative ease due to its high melt index but it is subsequently cross-linked to form a strong adhesive bond.

The present invention is illustrated by the following examples.

EXAMPLE I

Component A was formed by grafting an ethylene/vinyl acetate copolymer, containing 18% vinyl acetate and having a melt index of 500 dg/min before grafting, with 1.9% by weight of a 96/4 mixture of vinyl trimethoxysilane and 2,5-dimethyl-2,5-di-(t-butyl peroxy) hexane. The melt index of the polymer after grafting was approximately 250 dg/min.

Component B was a maleic anhydride-grafted ethylene/vinyl acetate copolymer containing 28% by weight of vinyl acetate and 0.8% by weight of grafted maleic anhydride. To this grafted polymer was added 5000 ppm of dibutyl tin dilaurate.

The melt viscosities of components A and B were measured over a period of time at 190° C. in a Brookfield apparatus having a Thermosel attachment using a shear rate of 0.35 sec$^{-1}$.

In addition, a blend of 90% by weight of component A and 10% by weight of component B was formed in a plasticorder at 150° C. for 5 minutes. The melt viscosity of the blend was also measured over a period of time.

The results obtained were as follows:

| COMPONENT | VISCOSITY (15 min.) | VISCOSITY (2 hrs.) |
|---|---|---|
| A | 27,600 | 32,000 |
| B | 22,000 | 30,000 |
| Blend | >2,000,000 | — |

These results show that components A and B would be suitable for use in a two-component hot melt adhesive applicator, because the melt viscosity was relatively stable over a period of two hours, showing only a small increase. In contrast the blend, which had been subjected to 150° C. for 5 minutes prior to the viscosity test at 190° C., had a melt viscosity after 15 minutes at 190° C. that would be unacceptable for use in a two-component hot melt adhesive applicator.

EXAMPLE II

Component C was formed by grafting an ethylene/vinyl acetate copolymer, containing 28% vinyl acetate and having a melt index of 800 dg/min before grafting, with 1.9% by weight of a 96/4 mixture of vinyl trimethoxysilane and 2,5-dimehtyl-2,5-di-(t-butyl peroxy) hexane. The melt index of the polymer after grafting was approximately 400 dg/min.

Component D was a maleic anhydride-grafted ethylene/vinyl acetate copolymer containing 28% by weight of vinyl acetate and 0.8% by weight of grafted maleic anhydride. To this grafted polymer was added 5000 ppm of dibutyl tin dilaurate.

The melt viscosities of components C and D were measured over a period of time at 190° C. using the procedure of Example I.

In addition, a blend of 90% by weight of component C and 10% by weight of component D was formed in a plasticorder at 150° C. for 5 minutes. The melt visosity of the blend was also measured over a period of time.

The results obtained were as follows:

| COMPONENT | VISCOSITY (15 min.) | VISCOSITY (2 hrs.) |
|---|---|---|
| C | 24,000 | 28,000 |
| D | 22,000 | 30,000 |
| Blend | >2,000,000 | — |

As in Example I, the results show that components C and D would be suitable for use in a two-component hot melt adhesive applicator, but the blend would not be.

EXAMPLE III

To further illustrate the present invention, tests were conducted on component A of Example I and on a 90/10 mixture of components A and B of Example I. The mixture was formed in a Brabender mixer for 5 minutes at 150° C., and then immediately applied to the substrate.

The following tests were done:

Tensile strength by the procedure of ASTM D638;

Elongation at failure by the procedure of ASTM D638;

Young's modulus by the procedure of ASTM D638;

Shear adhesion fail temperature for aluminum to aluminum bonds, as described above;

Lap shear for an aluminum to aluminum bond using the procedure of ASTM D1002; and Gel content using the procedure of ASTM D2765.

The results obtained were as follows:

| TEST | COMPONENT A | ADHESIVE |
|---|---|---|
| Tensile Strengths (PSI) | 450 | 780 |
| Elongation and Failure (%) | 600 | 600 |
| Young's Modulus (PSI) | 1150 | 1200 |
| Shear Adhesion Fail Temperature (°C.) | 110 | >199 |
| Lap Shear | 550 | 800 |
| Gel Content (%) | — | 44 |

The results showed that the adhesive had substantially higher shear adhesion fail temperature and lap shear in aluminum to aluminum bonds.

EXAMPLE IV

Using the procedures of Example III, tests were conducted on component C of Example II and on a 90/10 mixture of components C and D of Example II, the latter having been formed in a Brabender mixer for 5 minutes at 150° C., and then immediately applied to the substrate.

The results obtained were as follows:

| TEST | COMPONENT A | ADHESIVE |
|---|---|---|
| Tensile Strengths (PSI) | 280 | 468 |
| Elongation and Failure (%) | 540 | 600 |
| Young's Modulus (PSI) | 450 | 800 |
| Shear Adhesion Fail Temperature (°C.) | 82 | >199 |
| Lap Shear | 460 | 760 |
| Gel Content (%) | — | 38 |

The results showed that the adhesive had substantially higher shear adhesion fail temperature and lap shear in aluminum to aluminum bonds.

EXAMPLE V

An adhesive was formed from a 90/10 blend of components A and B of Example I. The adhesive was formed in a Brabender mixer, for 5 minutes at 150° C., and then immediately applied to a substrate formed from a chlorosulphonated polymer. A second substrate of the chlorosulphonated polymer was applied and subsequently the resultant structure was subjected to moisture in the form of steam to cure the adhesive.

The structure was subjected to the lap shear test and to the shear adhesion fail test both before and after the moisture curing of the adhesive. It was found that curing of the adhesive increased the lap shear from 21 psi to 39 psi on curing and that the shear adhesion fail test value increased from 100° C. to 150° C. on curing.

The procedure was repeated using an ethylene/propylene/diene copolymer (EPDM) substrate instead of the chlorosulphonated polymer. It was found that the lap shear was unchanged on curing but that the shear adhesion fail test value increased from 100° C. to 150° C. on curing.

The results show the value of the curable adhesives of the invention.

We claim:

1. An adhesive composition formed by admixing under melt conditions:
   (a) 50–95% by weight of a moisture cross-linkable silane-grafted polyolefin having a melt viscosity of less than 100 000 cps, and
   (b) 5–50% by weight of a polyolefin grafted with at least one ethylenically-unsaturated carboxylic acid or anhydride, and salt, amide, imide or ester derivatives thereof, said grafted polyolefin having a melt viscosity of less than 100 000 cps, said grafted polyolefin containing a catalyst for moisture cross-linking of the silane-grafted polyolefin of (a).

2. The adhesive of claim 1 in which the moisture cross-linking catalyst is dibutyl tin dilaurate.

3. The adhesive of claim 1 in which the polyolefin is selected from ethylene/vinyl acetate copolymer, polypropylene, polyethylene, ethylene/alkyl(meth) acrylate and ethylene/(meth) acrylic acid copolymers and copolymers of ethylene, alkyl acrylate and carbon monoxide.

4. The adhesive of claim 1 in which the melt viscosity of the composition is less than 100 000 cps.

5. The adhesive of claim 4 in which the melt viscosity of the composition is less than 50 000 cps.

6. The adhesive of claim 3 in which the silane is vinyl silane.

7. The adhesive of claim 6 in which the polyolefin of (b) is grafted with maleic anhydride.

8. A process for forming an adhesive composition comprising:
   (i) admixing under melt conditions
   (a) 50–95% by weight of a moisture cross-linkable silane-grafted polyolefin having a melt viscosity of less than 100 000 cps, and
   (b) 5–50% by weight of a polyolefin grafted with at least one ethylenically-unsaturated carboxylic acid or anhydride, and salt, amide, imide or ester derivatives thereof, said grafted polyolefin having a melt viscosity of less than 100 000 cps, said grafted polyolefin containing a catalyst for moisture cross-linking of the silane-grafted polyolefin of (a), and
   (ii) applying the molten adhesive so formed to a substrate.

9. The process of claim 8 in which the molten adhesive is applied to the substrate within five minutes of the admixing under melt conditions.

10. The process of claim 9 in which the polyolefin is selected from ethylene/vinyl acetate copolymer, polypropylene, polyethylene, ethylene/alkyl(meth) acrylate and ethylene/(meth) acrylic acid copolymers and copolymers of ethylene, alkyl acrylate and carbon monoxide.

\* \* \* \* \*